(12) United States Patent
Liu

(10) Patent No.: US 12,637,162 B2
(45) Date of Patent: May 26, 2026

(54) HEADLIGHT AND DISPLAY INTEGRATED STEM OF ELECTRIC BICYCLE, AND ELECTRIC BICYCLE

(71) Applicant: Haoqi Liu, Suzhou (CN)

(72) Inventor: Haoqi Liu, Suzhou (CN)

( * ) Notice: Subject to any disclaimer, the term of this patent is extended or adjusted under 35 U.S.C. 154(b) by 217 days.

(21) Appl. No.: 18/287,047

(22) PCT Filed: Apr. 15, 2022

(86) PCT No.: PCT/CN2022/087202
§ 371 (c)(1),
(2) Date: Oct. 16, 2023

(87) PCT Pub. No.: WO2022/218426
PCT Pub. Date: Oct. 20, 2022

(65) Prior Publication Data
US 2024/0199159 A1 Jun. 20, 2024

(30) Foreign Application Priority Data

Apr. 16, 2021 (CN) .......................... 202120780804.3

(51) Int. Cl.
| | |
|---|---|
| *B62J 6/03* | (2020.01) |
| *B62J 6/01* | (2020.01) |
| *B62J 45/20* | (2020.01) |
| *B62J 50/22* | (2020.01) |
| *B62K 21/18* | (2006.01) |
| *F21S 45/48* | (2018.01) |
| *F21W 107/13* | (2018.01) |

(52) U.S. Cl.
CPC . *B62J 6/03* (2020.02); *B62J 6/01* (2020.02); *B62J 45/20* (2020.02); *B62J 50/22* (2020.02); *B62K 21/18* (2013.01); *F21S 45/48* (2018.01); *F21W 2107/13* (2018.01)

(58) Field of Classification Search
CPC ....... F21W 2107/13; B62J 6/03; B62K 21/12; B62K 21/125; B62K 21/14; B62K 21/145; B62K 21/16; B62K 21/18; B62K 21/20; B62K 21/22; B62K 21/24
See application file for complete search history.

(56) References Cited

U.S. PATENT DOCUMENTS

2020/0047842 A1* 2/2020 Clifford-Brown ....... B62J 11/13

FOREIGN PATENT DOCUMENTS

| | | |
|---|---|---|
| CN | 205131538 U | 4/2016 |
| CN | 205524635 U | 8/2016 |
| CN | 213768817 U | 7/2021 |
| CN | 216128395 U | 3/2022 |

* cited by examiner

*Primary Examiner* — Sean P Gramling
(74) *Attorney, Agent, or Firm* — Bayramoglu Law Offices LLC

(57) ABSTRACT

A headlight and display integrated stem of an electric bicycle includes a display housing and a headlight housing. A display assembly is provided on the display housing. A headlight assembly is provided on the headlight housing. The display housing and the headlight housing are flexibly connected to each other. The headlight assembly and the display assembly are integrated to share a controller and a power supply, simplifying wiring.

18 Claims, 5 Drawing Sheets

100

HEADLIGHT AND DISPLAY INTEGRATED STEM OF ELECTRIC BICYCLE, AND ELECTRIC BICYCLE

CROSS REFERENCE TO THE RELATED APPLICATIONS

This application is the national phase entry of International Application No. PCT/CN2022/087202, filed on Apr. 15, 2022, which is based upon and claims priority to Chinese Patent Application No. 202120780804.3, filed on Apr. 16, 2021, the entire contents of which are incorporated herein by reference.

TECHNICAL FIELD

The present disclosure relates to the technical field of bicycles, and in particular to a headlight and display integrated stem of an electric bicycle, and the electric bicycle.

BACKGROUND

Electric bicycles are energy-saving, environment-friendly, economical, and have become popular. Currently, the electric bicycle available on the market uses a stem to connect the handlebar and the front fork such that the display and the light are separately mounted at the headset. Such a design takes up additional space and requires connecting the display and the light to the electric bicycle's controller or battery separately. In addition, the operation interfaces of the display and the light are separate, and the display controlling the motor cannot control the headlight.

SUMMARY

An objective of the present disclosure is to provide a headlight and display integrated stem of an electric bicycle, and the electric bicycle. The present disclosure integrates a display and a headlight in an electric bicycle such that they share a controller and a power supply.

Embodiments of the present disclosure are implemented as follows:

A headlight and display integrated stem of an electric bicycle includes a housing, where the housing includes a display housing and a headlight housing; a display assembly is provided on the display housing; a headlight assembly is provided on the headlight housing; and the display housing and the headlight housing are flexibly connected to each other.

Optionally, in an implementable solution, the headlight assembly is fixed to a side of the headlight housing away from the display housing through a first screw, and the display assembly is fixed above the display housing through a snap-fit mechanism or a second screw.

Optionally, in an implementable solution, gaskets are provided at a connection between the headlight assembly and the headlight housing and a connection between the display assembly and the display housing, respectively, and the gaskets are configured for sealing and insulation.

Optionally, in an implementable solution, a U-shaped rubber gasket is provided at the connection between the headlight assembly and the headlight housing, and an O-ring is provided at the connection between the display assembly and the display housing.

Optionally, in an implementable solution, a filling layer made of thermally conductive material is provided between the headlight assembly and the headlight housing.

Optionally, in an implementable solution, a main control circuit board is provided in the display housing, and the headlight assembly and the display assembly are connected to the main control circuit board through a signal cable.

Optionally, in an implementable solution, a back of the main control circuit board is provided with a thermally conductive sheet made of graphene.

Optionally, in an implementable solution, both the headlight housing and the display housing are heat dissipation housings, and two sides of the display housing are provided with a plurality of heat dissipation grooves to increase a contact area between the display housing and air.

Optionally, in an implementable solution, the plurality of heat dissipation grooves are provided in parallel at the sides of the display housing.

Optionally, in an implementable solution, one end of the display housing is provided with a first arc-shaped groove, and an end of the headlight housing is provided with a second arc-shaped groove; and the second arc-shaped groove is butted with the first arc-shaped groove to form a fixing hoop.

Optionally, in an implementable solution, the other end of the display housing is provided with a tube mounting hole for fixedly mounting a front fork tube; the tube mounting hole and the first arc-shaped groove are located at the two ends of the display housing, respectively; a tube screw with a tail part facing the front fork tube is provided in the tube mounting hole; the tube screw is threaded with the front fork tube; and a side wall of the tube mounting hole is provided with a tightening through-hole.

Optionally, in an implementable solution, a fixing bracket is provided below the display housing, and the fixing bracket is configured to fix the display housing to the electric bicycle.

Optionally, in an implementable solution, the fixing bracket is a circular clamp.

Optionally, in an implementable solution, the display assembly includes a first display panel and a display circuit board electrically connected to the first display panel; the first display panel is located above the display housing; the display circuit board is located inside the display housing, and the display circuit board is connected to the main control circuit board through a signal cable; and a signal cable of the headlight assembly is connected to the main controller circuit board through a first connector.

Optionally, in an implementable solution, a first cable outlet and a second cable outlet are provided at a rear side of the display housing away from the headlight housing; a first signal cable of the main control circuit board is led out from the first cable outlet and connected to a controller of the electric bicycle; and a second signal cable of the main control circuit board is led out from the second cable outlet and connected to a button assembly of the electric bicycle.

Optionally, in an implementable solution, the headlight housing is provided with a first through-hole; the display housing is provided with a second through-hole and a third through-hole; the second through-hole is communicated with the first through-hole; and the signal cable of the headlight assembly extends out of the display housing through the first through-hole and the second through-hole, extends into the display housing through the third through-hole, and then is connected to the main control circuit board.

Optionally, in an implementable solution, a connection plate electrically connected to the main control circuit board is further provided in the display housing; the connection plate is provided with a plurality of second connectors; and the plurality of second connectors are respectively connected to the signal cable of the headlight assembly, the controller of the electric bicycle, and the button assembly of the electric bicycle.

Optionally, in an implementable solution, the headlight assembly includes a headlight circuit board and a plurality of light-emitting diode (LED) beads electrically connected to the headlight circuit board; and signal cables of the plurality of LED beads are connected to the main control circuit board through the headlight circuit board.

Optionally, in an implementable solution, the main control circuit board is further electrically connected to a battery of the electric bicycle.

Optionally, in an implementable solution, the display assembly includes a second display panel and a display bracket; the display bracket is fixedly connected to the display housing; the second display panel is electrically connected to the main control circuit board; and the second display panel and the main control circuit board are fixed to the display bracket.

Optionally, in an implementable solution, a square groove communicated with the first arc-shaped groove and configured to store the signal cables is provided in the display housing; a side wall of the square groove runs through the display housing to form a fourth through-hole; a fifth through-hole is provided in the headlight housing; and one end of the fifth through-hole extends to the headlight assembly, and the other end of the fifth through-hole is butted with the fourth through-hole.

Optionally, in an implementable solution, the signal cable of the headlight assembly passes through the fifth through-hole and the fourth through-hole, and then is connected to the main control circuit board through the square groove.

An electric bicycle includes the headlight and display integrated stem according to any of the above paragraphs.

The embodiments of the present disclosure have the following beneficial effects:

In the present disclosure, the headlight and display integrated stem of an electric bicycle includes a housing, where the housing includes a display housing and a headlight housing; a display assembly is provided on the display housing; a headlight assembly is provided on the headlight housing; and the display housing and the headlight housing are flexibly connected to each other. In the headlight and display integrated stem of the electric bicycle, the display housing and the headlight housing are combined to form the headlight and display integrated stem of the electric bicycle. The headlight and display integrated stem of the electric bicycle is connected to a handlebar and a front fork of the electric bicycle, replacing the existing simple mechanical stem. The design achieves the integration of the headlight assembly and the display assembly, and the headlight assembly and the display assembly can share a controller and a power supply, eliminating complex wiring and reducing the manufacturing cost of the entire electric bicycle.

BRIEF DESCRIPTION OF THE DRAWINGS

To describe the technical solutions in the embodiments of the present application more clearly, the drawings required by the embodiments are briefly described below. It should be understood that, the following drawings show merely some embodiments of the present application, and thus should not be regarded as a limitation to the scope of the present application. A person of ordinary skill in the art may still derive other related drawings from these drawings without creative efforts.

Figure 1:
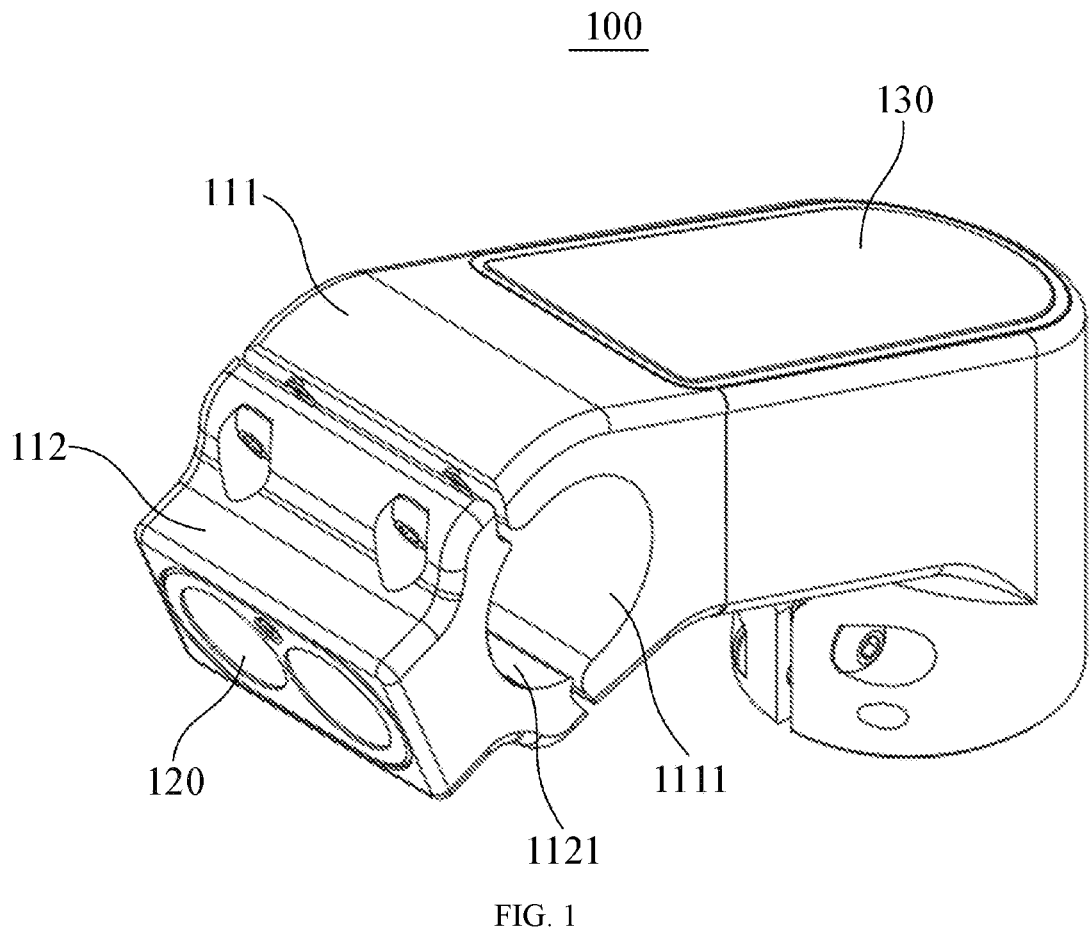
FIG. 1 is a first structural diagram of a headlight and display integrated stem of an electric bicycle according to an embodiment of the present disclosure.

Reference Numerals: 100. headlight and display integrated stem of electric bicycle; 111. display housing; 1111. first arc-shaped groove; 1112. tube mounting hole; 1113. second through-hole; 1114. third through-hole; 1115. fourth through-hole; 1116. square groove; 1117. heat dissipation groove; 112. headlight housing; 1121. second arc-shaped groove; 1122. first through-hole; 1123. fifth through-hole; 114. circular clamp; 120. headlight assembly; 121. headlight circuit board; 122. LED bead; 130. display assembly; 131. first display panel; 132. display circuit board; 133. protective glass; 134. second display panel; 135. display bracket; 140. main control circuit board; 150. connection plate; 151. second connector; 160. tube screw; and 170. tightening through-hole.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the drawings in the embodiments of the present disclosure. Apparently, the described embodiments are some but not all of the embodiments of the present disclosure. Generally, components of the embodiments of the present disclosure described and shown in the drawings may be arranged and designed in various manners.

Therefore, the detailed description of the embodiments of the present disclosure with reference to the drawings is not intended to limit the protection scope of the present disclosure, but merely to represent the selected embodiments of the present disclosure. All other embodiments obtained by a person of ordinary skill in the art based on the embodiments of the present disclosure without creative efforts should fall within the protection scope of the present disclosure.

It should be noted that similar reference signs and letters represent similar items in the drawings below. Therefore, once an item is defined in one drawing, it does not need to be further defined and described in subsequent drawings.

In the description of the present disclosure, it should be noted that orientation or position relationships indicated by terms such as "center", "vertical", "horizontal", "inner", and "outer" are orientation or position relationships shown in the drawings or when the product of the present disclosure is usually placed in operation. These terms are only used to facilitate description of the present disclosure and simplify the description, rather than to indicate or imply that the mentioned apparatus or components must have a specific orientation or must be established and operated in a specific orientation. Therefore, they should not be construed as a limitation to the present disclosure. In addition, the terms such as "first", "second", and "third" are used only for the purpose of description and cannot be understood to indicate or imply relative importance.

Moreover, terms such as "horizontal" and "vertical" do not mean that a component is absolutely horizontal or overhanging, but that it can be tilted slightly. If "horizontal" only means that a direction of the component is more horizontal than "vertical", it does not mean that the structure must be completely horizontal, but can be tilted slightly.

In the description of the present disclosure, it should be noted that, unless otherwise clearly specified, meanings of terms "provide", "mount", "connected with", and "connected to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

Figure 2:
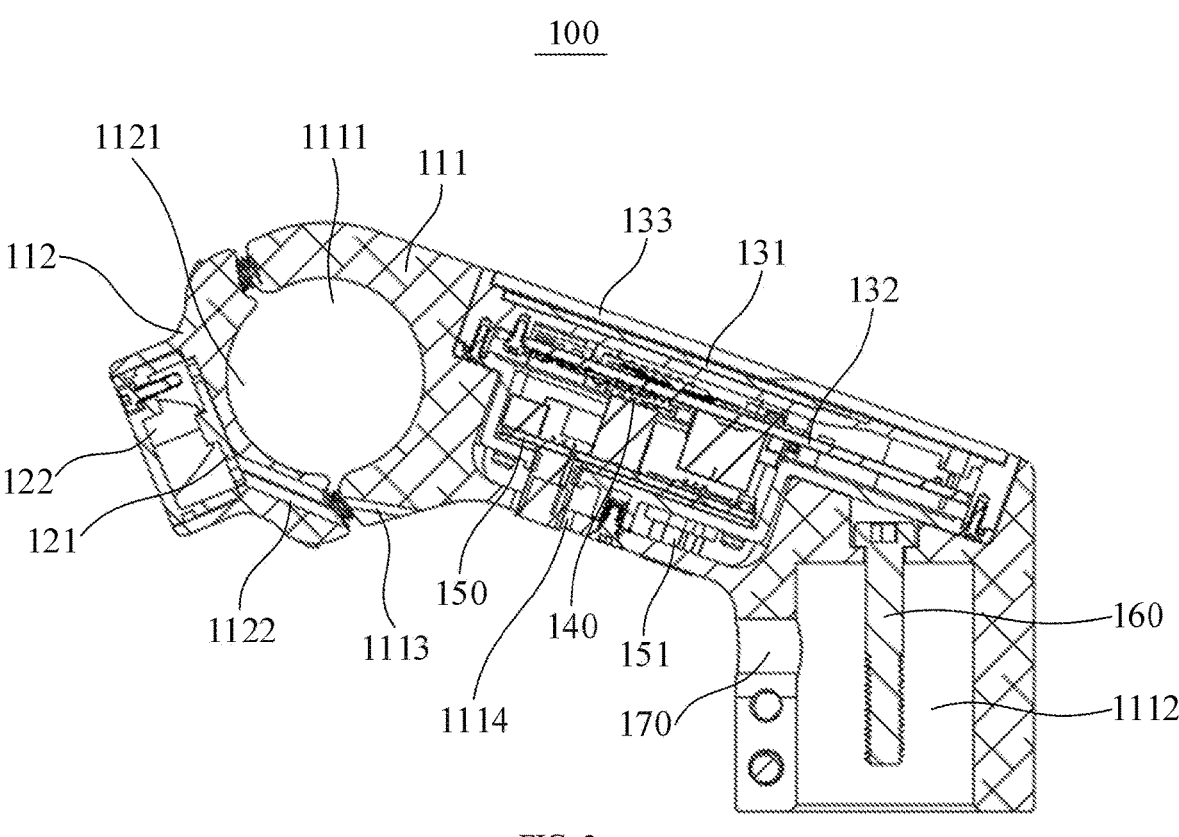
FIG. 2 is a first section view of the headlight and display integrated stem of an electric bicycle according to an embodiment of the present disclosure.

Referring to FIGS. 1 and 2, an embodiment of the present disclosure provides headlight and display integrated stem 100 of an electric bicycle. The integrated stem includes a housing. The housing includes display housing 111 and headlight housing 112. Display assembly 130 is provided on the display housing 111. Headlight assembly 120 is provided on the headlight housing 112. The display housing 111 and the headlight housing 112 are flexibly connected to each other.

The housing of the headlight and display integrated stem 100 of the electric bicycle includes the display housing 111 and the headlight housing 112 that are detachably and flexibly connected to each other. The display housing 111 is configured to mount and fix the display assembly 130, and the headlight housing 112 is configured to mount and fix the headlight assembly 120. The display housing 111 and the headlight housing 112 can be connected through a fastener (such as a screw) to form the integrated stem, and can accommodate signal cables of the display assembly 130 and the headlight assembly 120. The display housing 111 and the headlight housing 112 can be made of a high-strength metal to ensure stability comparable to that of a traditional stem.

In the headlight and display integrated stem 100 of the electric bicycle, the display housing 111 and the headlight housing 112 are combined to form the headlight and display integrated stem of the electric bicycle. The headlight and display integrated stem of the electric bicycle is connected to a handlebar and a front fork of the electric bicycle, replacing the existing simple mechanical stem. The design achieves the integration of the headlight assembly 120 and the display assembly 130, and the headlight assembly 120 and the display assembly 130 can share a controller and a power supply, eliminating complex wiring and reducing the manufacturing cost of the entire electric bicycle Optionally, in an implementable solution of the embodiment of the present disclosure, the headlight assembly 120 is fixed to a side of the headlight housing 112 away from the display housing 111 through a first screw, and the display assembly 130 is fixed above the display housing 111 through a snap-fit mechanism or a second screw.

The headlight assembly 120 is located at a front side of the headlight housing 112 to illuminate a road ahead during cycling. The display assembly 130 is located above the display housing 111 and faces a user side to facilitate monitoring of cycling data at any time. The headlight assembly 120 and the display assembly 130 are fixed through a screw or snap-fit mechanism, achieving convenient and fast mounting.

Optionally, in an implementable solution of the embodiment of the present disclosure, gaskets are provided at a connection between the headlight assembly 120 and the headlight housing 112 and a connection between the display assembly 130 and the display housing 111, respectively, and the gaskets are configured for sealing and insulation.

The gasket has the function of sealing and insulation. The gasket can prevent external moisture and dust from entering the headlight housing 112 and the display housing 111 through the connection to affect the normal operation of components inside the headlight housing 112 and the display housing 111. The gasket can also prevent the headlight housing 112 and the display housing 111 from being electrified, protecting the safety of the user. It should be understood that gasket can be provided at any position where two components are combined.

Optionally, in an implementable solution of the embodiment of the present disclosure, a U-shaped rubber gasket is provided at the connection between the headlight assembly 120 and the headlight housing 112, and an O-ring is provided at the connection between the display assembly 130 and the display housing 111.

Optionally, in an implementable solution of the embodiment of the present disclosure, a filling layer made of thermally conductive material is provided between the headlight assembly 120 and the headlight housing 112.

When the headlight assembly 120 emits light, it emits a large amount of heat. The filling layer made of thermally conductive material can effectively dissipate heat to prevent damage to the headlight assembly 120 caused by excessive heat or to prevent heat from being transferred through the headlight housing 112 to the components inside the headlight housing 112 and the display housing 111 to cause high-temperature failure. The filling layer can play a role of insulation to protect the safety of the user.

Optionally, in an implementable solution of the embodiment of the present disclosure, main control circuit board 140 is provided in the display housing 111, and the headlight assembly 120 and the display assembly 130 are connected to the main control circuit board 140 through a signal cable.

The signal cables of the headlight assembly 120 and the display assembly 130 are connected to the main control circuit board 140 to simultaneously control the headlight assembly 120 and the display assembly 130. The design eliminates the need for independent controllers and complex wiring, saving costs and facilitating maintenance. For example, the headlight assembly 120 and the display assembly 130 can also be connected to the main control circuit board 140 through a Bluetooth or radio frequency identification (RFID) function.

Optionally, in an implementable solution of the embodiment of the present disclosure, a back of the main control circuit board 140 is provided with a thermally conductive sheet made of graphene. The thermally conductive sheet is located at a side of the main control circuit board 140 without any plug-in or signal cable, so as to export the heat generated by the main control circuit board 140 and avoid the failure of the main control circuit board 140 due to high temperature.

Figure 3:
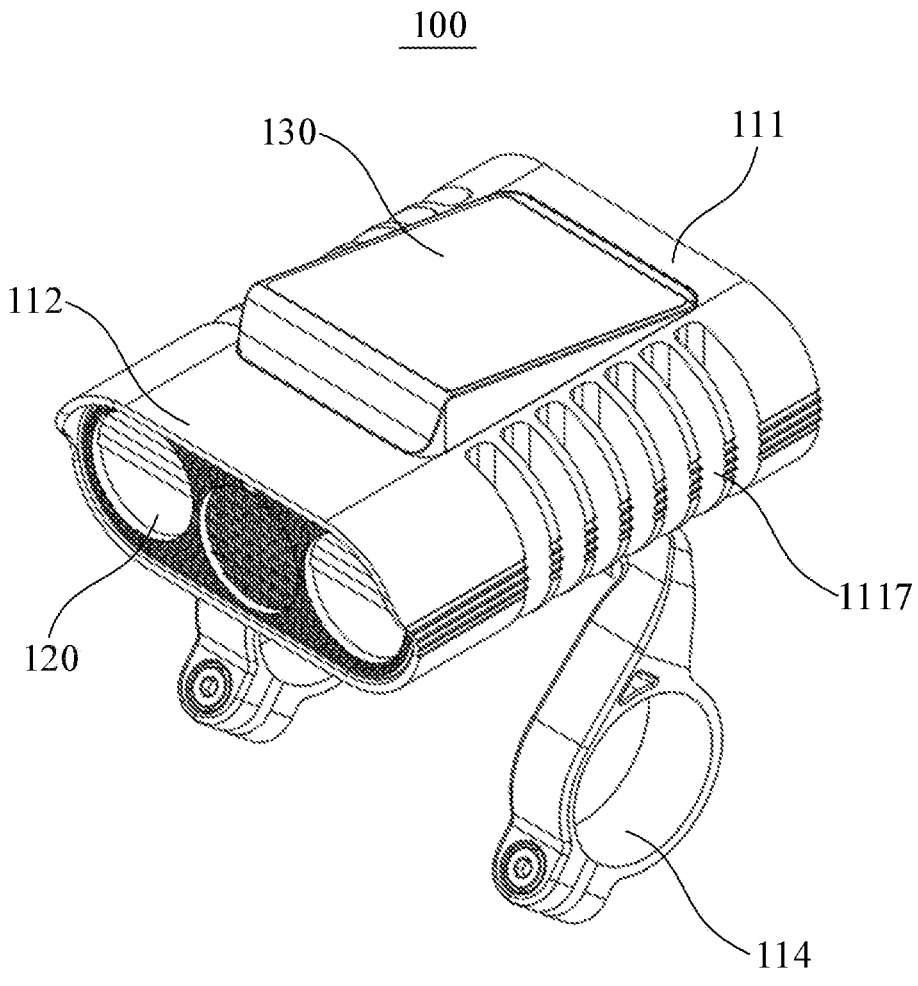
FIG. 3 is a second structural diagram of the headlight and display integrated stem of an electric bicycle according to an embodiment of the present disclosure.

Referring to FIG. 3, optionally, in an implementable solution of the embodiment of the present disclosure, both the headlight housing 112 and the display housing 111 are heat dissipation housings, and two sides of the display housing 111 are provided with a plurality of heat dissipation grooves 1117 to increase a contact area between the display housing and air. The materials of the headlight housing 112 and the display housing 111 have a heat dissipation characteristic, and the display housing 111 is provided with the heat dissipation grooves 1117, thereby achieving effective heat dissipation during cycling.

Optionally, in an implementable solution of the embodiment of the present disclosure, the plurality of heat dissipation grooves 1117 are provided in parallel at the sides of the display housing 111. The design of the plurality of heat dissipation grooves 1117 further increases the contact area between the display housing and air, improving heat dissipation efficiency.

Referring to FIGS. 1 and 2, optionally, in an implementable solution of the embodiment of the present disclosure, one end of the display housing 111 is provided with first arc-shaped groove 1111, and an end of the headlight housing 112 is provided with second arc-shaped groove 1121. The second arc-shaped groove 1121 is butted with the first arc-shaped groove 1111 to form a fixing hoop.

The first arc-shaped groove 1111 is provided at the end of the display housing 111 connected to the headlight housing 112. Correspondingly, the second arc-shaped groove 1121 is provided at the end of the headlight housing 112 connected to the display housing 111. The first arc-shaped groove 1111 and the second arc-shaped groove 1121 are butted with each other to form the fixing hoop for mounting the handlebar, thereby connecting the headlight and display integrated stem 100 of the electric bicycle with the electric bicycle and avoiding loosening between the headlight and display integrated stem of the electric bicycle and the electric bicycle on bumpy roads.

For example, the first arc-shaped groove 1111 and the second arc-shaped groove 1121 are semi-cylindrical grooves. The first arc-shaped groove 1111 and the second arc-shaped groove 1121 are butted with each other to form a cylindrical fixing hoop.

Optionally, in an implementable solution of the embodiment of the present disclosure, the other end of the display housing 111 is provided with tube mounting hole 1112 for fixedly mounting a front fork tube. The tube mounting hole 1112 and the first arc-shaped groove 1111 are located at two ends of the display housing 111 respectively to accommodate the front fork tube of the electric bicycle. Tube screw 160 with a tail part facing the front fork tube is provided in the tube mounting hole 1112. The tube screw 160 is threaded with the front fork tube. A side wall of the tube mounting hole 1112 is provided with tightening through-hole 170. A tightening screw passes through the tightening through-hole 170 and is butted against a side wall of the front fork tube to further secure the front fork tube.

Figure 4:
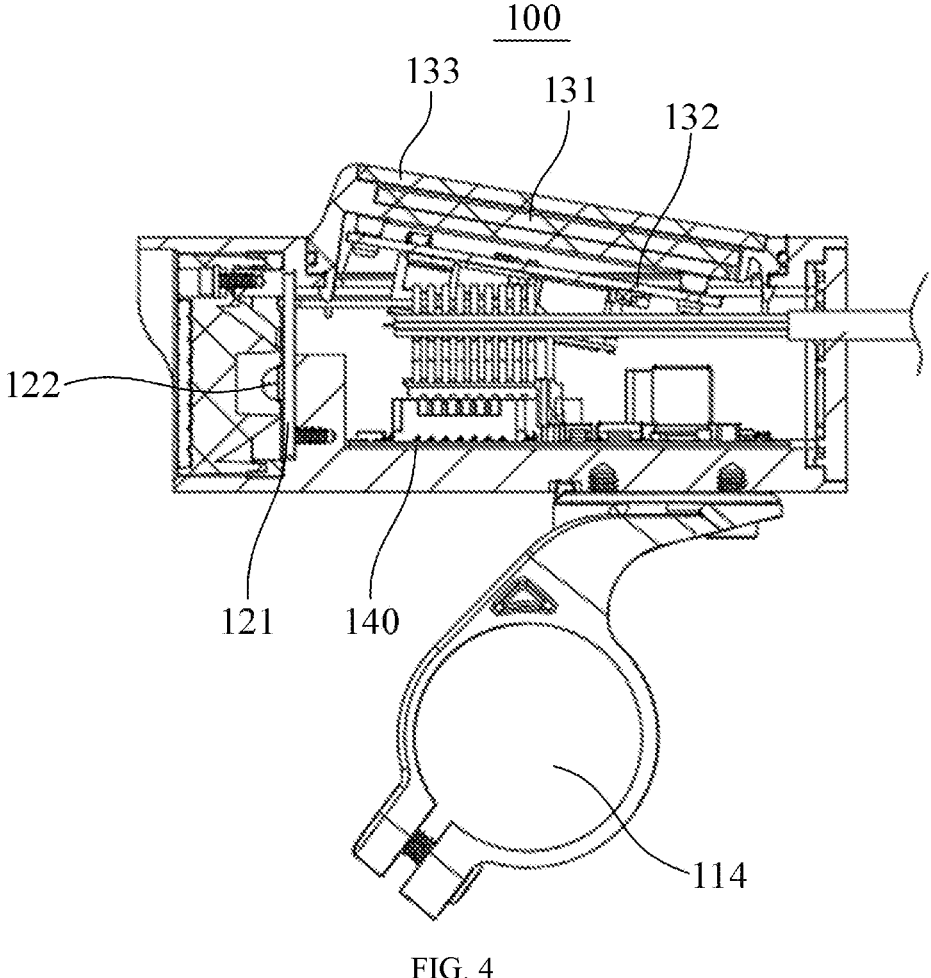
FIG. 4 is a second section view of the headlight and display integrated stem of an electric bicycle according to an embodiment of the present disclosure.

Referring to FIGS. 3 and 4, optionally, in an implementable solution of the embodiment of the present disclosure, a fixing bracket is provided below the display housing 111, and the fixing bracket is configured to fix the display housing 111 to the electric bicycle. Optionally, in an implementable solution of the embodiment of the present disclosure, the fixing bracket is a circular clamp 114. The circular clamp 114 is fastened at a corresponding position of the electric bicycle body to avoid loosening of the headlight and display integrated stem 100 of the electric bicycle.

Referring to FIGS. 2 and 4, optionally, in an implementable solution of the embodiment of the present disclosure, the display assembly 130 includes first display panel 131 and display circuit board 132 electrically connected to the first display panel. The first display panel 131 is located above the display housing 111 and faces the user side. The display circuit board 132 is located inside the display housing 111. The display circuit board 132 is connected to the main control circuit board 140 through a signal cable. A signal cable of the headlight assembly 120 is connected to the main controller circuit board through a first connector. The first display panel 131 can be provided with protective glass 133 to prevent damage to the display panel.

Optionally, in an implementable solution of the embodiment of the present disclosure, a first cable outlet and a second cable outlet are provided at a rear side of the display housing 111 away from the headlight housing 112. A first signal cable of the main control circuit board 140 is led out from the first cable outlet and connected to a controller of the electric bicycle. A second signal cable of the main control circuit board 140 is led out from the second cable outlet and connected to a button assembly of the electric bicycle.

The main control circuit board 140 is connected to the first signal cable and the second signal cable with different functions. The rear side of the display housing 111 is provided with the first cable outlet and the second cable outlet that respectively face the controller and the button assembly. The first signal cable extends out of the display housing 111 through the first cable outlet and is connected to the controller of the electric bicycle to achieve electrical connection between the main control circuit board 140 and the controller. The second signal cable extends out of the display housing 111 through the second cable outlet and is connected to the button assembly to achieve button control.

Optionally, in an implementable solution of the embodiment of the present disclosure, the headlight housing 112 is provided with first through-hole 1122. The display housing 111 is provided with second through-hole 1113 and third through-hole 1114. The second through-hole 1113 is communicated with the first through-hole 1122. The signal cable of the headlight assembly 120 extends out of the display housing 111 through the first through-hole 1122 and the second through-hole 1113, extends into the display housing 111 through the third through-hole 1114, and then is connected to the main control circuit board 140.

One end of the first through-hole 1122 extends to the headlight assembly 120, and the other end of the first through-hole 1122 corresponds to one end of the second through-hole 1113. The other end of the second through-hole 1113 is externally connected. The third through-hole 1114 includes one end internally connected to the display housing 111 and the other end externally connected. The signal cable of the headlight assembly 120 extends out of the display housing 111 through the first through-hole 1122 and the second through-hole 1113, extends into the display housing 111 through the third through-hole 1114, and then is connected to the main control circuit board 140. It should be understood that the signal cable of the headlight assembly 120 can be directly connected to the main control circuit board 140 or connected to the main control circuit board 140 through a component.

Referring to FIG. 2, optionally, in an implementable solution of the embodiment of the present disclosure, connection plate 150 electrically connected to the main control circuit board 140 is further provided in the display housing 111. The connection plate 150 is provided with a plurality of second connectors 151. The a plurality of second connectors 151 are respectively connected to the signal cable of the headlight assembly 120, the controller of the electric bicycle, and the button assembly of the electric bicycle. The main control circuit board 140 is electrically connected to the headlight assembly 120, the controller, and the button assembly through the second connectors 151 on the connection plate 150.

Optionally, in an implementable solution of the embodiment of the present disclosure, the headlight assembly 120 includes headlight circuit board 121 and a plurality of light-emitting diode (LED) beads 122 electrically connected to the headlight circuit board 121. Signal cables of the plurality of LED beads 122 are connected to the main control circuit board 140 through the headlight circuit board 121.

The signal cables of the plurality of LED beads 122 are connected to the main control circuit board 140 through the headlight circuit board 121 and powered by the main control circuit board 140. The main control circuit board 140 independently controls the plurality of LED beads 122. The LED beads 122 can be adjusted to emit high and low beams to adapt to various environments. Meanwhile, the headlight assembly 120 can also be connected to a photosensitive resistor. The user can set the headlight assembly 120 to an automatic position so as to turn on a headlight automatically.

Optionally, in an implementable solution of the embodiment of the present disclosure, the main control circuit board 140 is further electrically connected to the battery of the electric bicycle. The battery provides power to the main control circuit board 140, allowing the main control circuit board 140 to operate continuously.

Figure 5:
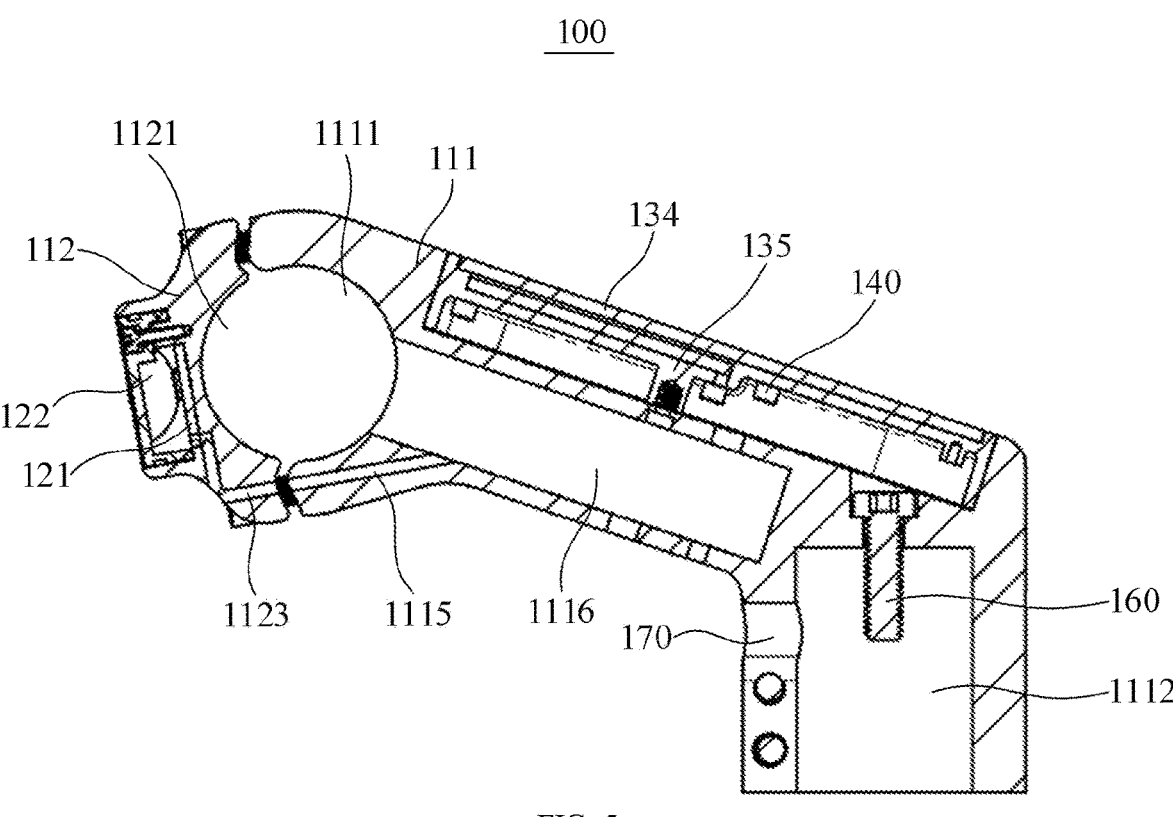
FIG. 5 is a third section view of the headlight and display integrated stem of an electric bicycle according to an embodiment of the present disclosure.

Referring to FIGS. 1 and 5, optionally, in an implementable solution of the embodiment of the present disclosure, the display assembly 130 includes second display panel 134 and display bracket 135. The display bracket 135 is fixedly connected to the display housing 111. The second display panel 134 is electrically connected to the main control circuit board 140. The second display panel 134 and the main control circuit board 140 are fixed to the display bracket 135. The second display panel 134 is fixed to the display housing 111 through the display bracket 135 and connected to the main control circuit board 140 inside the display housing 111 to achieve control of the electric bicycle. The display bracket 135 ensures the stability of the second display panel 134 during cycling.

Optionally, in an implementable solution of the embodiment of the present disclosure, square groove 1116 communicated with the first arc-shaped groove 1111 and configured to store the signal cables is provided in the display housing 111. A side wall of the square groove 1116 runs through the display housing 111 to form fourth through-hole 1115. Fifth through-hole 1123 is provided in the headlight housing 112. One end of the fifth through-hole 1123 extends to the headlight assembly 120, and the other end of the fifth through-hole 1123 is butted with the fourth through-hole 1115. The square groove 1116 is located inside the display housing 111 and below the display assembly 130, and is configured to store the signal cable that passes through the fourth through-hole 1115. After the display housing 111 and the headlight housing 112 are butted with each other, the fourth through-hole 1115 and the fifth through-hole 1123 are connected through to lead the signal cable inside the headlight housing 112 into the square groove 1116.

Optionally, in an implementable solution of the embodiment of the present disclosure, a side wall of the square groove 1116 is provided with a hole leading to the main control circuit board 140. The signal cable of the headlight assembly 120 passes through the fifth through-hole 1123 and the fourth through-hole 1115, and then is connected to the main control circuit board 140 through the square groove 1116.

An embodiment of the present disclosure further provides an electric bicycle, including the headlight and display integrated stem according to any of the above paragraphs. The electric bicycle has the same structure and beneficial effects as the headlight and display integrated stem in the aforementioned embodiment. The structure and beneficial effects of the headlight and display integrated stem of the electric bicycle are described in detail in the aforementioned embodiment, and will not be repeated herein.

The foregoing are merely preferred embodiments of the present disclosure and are not intended to limit the present disclosure, and various changes and modifications can be made to the present disclosure by those skilled in the art. Any modifications, equivalent substitutions, improvements, and the like made within the spirit and principle of the present disclosure should fall within the protection scope of the present disclosure.

INDUSTRIAL APPLICABILITY

In the headlight and display integrated stem of the electric bicycle, the display housing and the headlight housing are combined to form the headlight and display integrated stem of the electric bicycle. The headlight and display integrated stem of the electric bicycle is connected to a handlebar and a front fork of the electric bicycle, replacing the existing simple mechanical stem. The design achieves the integration of the headlight assembly and the display assembly, and the headlight assembly and the display assembly can share a controller and a power supply, eliminating complex wiring and reducing the manufacturing cost of the entire electric bicycle.

What is claimed is:

1. A headlight and display integrated stem of an electric bicycle, comprising a housing, wherein the housing comprises a display housing and a headlight housing; a display assembly is provided on the display housing; a headlight assembly is provided on the headlight housing; and the display housing and the headlight housing are flexibly connected to each other;

wherein a main control circuit board is provided in the display housing, and the headlight assembly and the display assembly are connected to the main control circuit board through a signal cable.

2. The headlight and display integrated stem of the electric bicycle according to claim 1, wherein the headlight assembly is fixed to a side of the headlight housing through a first screw, wherein the side of the headlight housing is away from the display housing, and the display assembly is fixed above the display housing through a snap-fit mechanism or a second screw.

3. The headlight and display integrated stem of the electric bicycle according to claim 1, wherein gaskets are provided at a connection between the headlight assembly and the headlight housing and a connection between the display assembly and the display housing, respectively, and the gaskets are configured for sealing and insulation.

4. The headlight and display integrated stem of the electric bicycle according to claim 1, wherein a filling layer made of thermally conductive material is provided between the headlight assembly and the headlight housing.

5. The headlight and display integrated stem of the electric bicycle according to claim 1, wherein a back of the main control circuit board is provided with a thermally conductive sheet made of graphene.

6. The headlight and display integrated stem of the electric bicycle according to claim 1, wherein a first end of the display housing is provided with a first arc-shaped groove, and an end of the headlight housing is provided with a second arc-shaped groove; and the second arc-shaped groove is butted with the first arc-shaped groove to form a fixing hoop.

7. The headlight and display integrated stem of the electric bicycle according to claim 6, wherein a second end of the display housing is provided with a tube mounting hole for fixedly mounting a front fork tube; the tube mounting hole and the first arc-shaped groove are located at the second end and the first end of the display housing, respectively; a tube screw with a tail part facing the front fork tube is provided in the tube mounting hole; the tube screw is threaded with the front fork tube; and a side wall of the tube mounting hole is provided with a tightening through-hole.

8. The headlight and display integrated stem of the electric bicycle according to claim 1, wherein the display assembly comprises a first display panel and a display circuit board electrically connected to the first display panel; the first display panel is located above the display housing; the display circuit board is located inside the display housing, and the display circuit board is connected to the main control circuit board through the signal cable; and a signal cable of the headlight assembly is connected to the main controller circuit board through a first connector.

9. The headlight and display integrated stem of the electric bicycle according to claim 8, wherein a first cable outlet and a second cable outlet are provided at a rear side of the display housing, wherein the rear side of the display housing is away from the headlight housing; a first signal cable of the main control circuit board is led out from the first cable outlet and connected to a controller of the electric bicycle; and a second signal cable of the main control circuit board is led out from the second cable outlet and connected to a button assembly of the electric bicycle.

10. The headlight and display integrated stem of the electric bicycle according to claim 1, wherein the headlight housing is provided with a first through-hole; the display housing is provided with a second through-hole and a third through-hole; the second through-hole is communicated with the first through-hole; and a signal cable of the headlight assembly extends out of the display housing through the first through-hole and the second through-hole, extends into the display housing through the third through-hole, and then is connected to the main control circuit board.

11. The headlight and display integrated stem of the electric bicycle according to claim 10, wherein a connection plate electrically connected to the main control circuit board is further provided in the display housing; the connection plate is provided with a plurality of second connectors; and the plurality of second connectors are respectively connected to the signal cable of the headlight assembly, a controller of the electric bicycle, and a button assembly of the electric bicycle.

12. The headlight and display integrated stem of the electric bicycle according to claim 1, wherein the main control circuit board is further electrically connected to a battery of the electric bicycle.

13. The headlight and display integrated stem of the electric bicycle according to claim 1, wherein the display assembly comprises a second display panel and a display bracket; the display bracket is fixedly connected to the display housing; the second display panel is electrically connected to the main control circuit board; and the second display panel and the main control circuit board are fixed to the display bracket.

14. The headlight and display integrated stem of the electric bicycle according to claim 6, wherein a square groove communicated with the first arc-shaped groove and configured to store the signal cables is provided in the display housing; a side wall of the square groove runs through the display housing to form a fourth through-hole; a fifth through-hole is provided in the headlight housing; and a first end of the fifth through-hole extends to the headlight assembly, and a second end of the fifth through-hole is butted with the fourth through-hole.

15. The headlight and display integrated stem of the electric bicycle according to claim 14, wherein a signal cable of the headlight assembly passes through the fifth through-hole and the fourth through-hole, and then is connected to the main control circuit board through the square groove.

16. An electric bicycle, comprising the headlight and display integrated stem of the electric bicycle according to claim 1.

17. A headlight and display integrated stem of an electric bicycle, comprising a housing, wherein the housing comprises a display housing and a headlight housing; a display assembly is provided on the display housing; a headlight assembly is provided on the headlight housing; and the display housing and the headlight housing are flexibly connected to each other;

wherein a U-shaped rubber gasket is provided at the connection between the headlight assembly and the headlight housing, and an O-ring is provided at the connection between the display assembly and the display housing.

18. A headlight and display integrated stem of an electric bicycle, comprising a housing, wherein the housing comprises a display housing and a headlight housing; a display assembly is provided on the display housing; a headlight assembly is provided on the headlight housing; and the display housing and the headlight housing are flexibly connected to each other;

wherein the headlight assembly comprises a headlight circuit board and a plurality of light-emitting diode (LED) beads electrically connected to the headlight circuit board; and signal cables of the plurality of LED beads are connected to a main control circuit board through the headlight circuit board.

* * * * *